US006822673B1

(12) United States Patent
Kelly

(10) Patent No.: US 6,822,673 B1
(45) Date of Patent: Nov. 23, 2004

(54) CHILD MONITORING SYSTEM

(76) Inventor: Elle B. Kelly, 350 Shepard Ave., Englewood, NJ (US) 07631-3224

( * ) Notice: Subject to any disclaimer, the term of this patent is extended or adjusted under 35 U.S.C. 154(b) by 617 days.

(21) Appl. No.: 09/648,132

(22) Filed: Aug. 25, 2000

(51) Int. Cl.[7] .............................. H04N 7/18; G02F 1/153
(52) U.S. Cl. ......................... 348/61; 348/148; 350/624; 359/267
(58) Field of Search ................... 348/61, 148; 350/624; 359/267, 859, 871; 362/492

(56) References Cited

U.S. PATENT DOCUMENTS

| 1,986,033 A | | 1/1935 | Trufant | |
|---|---|---|---|---|
| 4,687,305 A | * | 8/1987 | Harris, Jr. et al. | .......... 350/624 |
| 4,733,956 A | | 3/1988 | Erickson | |
| D332,076 S | | 12/1992 | El-Faham | |
| 5,453,882 A | | 9/1995 | Westman | |
| 5,570,127 A | * | 10/1996 | Schmidt | ..................... 348/148 |
| 5,576,898 A | | 11/1996 | Rubin | |
| 5,634,709 A | * | 6/1997 | Iwama | ........................ 362/492 |
| 5,793,420 A | * | 8/1998 | Schmidt | ..................... 348/148 |
| 5,808,778 A | * | 9/1998 | Bauer et al. | ................. 359/267 |
| 6,151,065 A | * | 11/2000 | Steed et al. | .................. 348/148 |
| 6,412,959 B1 | * | 7/2002 | Tseng | .......................... 359/859 |
| 6,447,128 B1 | * | 9/2002 | Lang et al. | .................. 359/871 |

FOREIGN PATENT DOCUMENTS

EP          2 301 922 A  * 12/1996          ........... B60R/21/00

* cited by examiner

Primary Examiner—Chris Kelley
Assistant Examiner—Allen Wong

(57) ABSTRACT

A child monitoring system for monitoring children seated in a rear of the interior of a vehicle. The child monitoring system includes a vehicle with an interior compartment, a housing coupled to an interior surface of a front portion of the interior compartment of the vehicle, a viewing device contained within the housing, a monitoring device coupled to an interior surface of a rear portion of the interior compartment of the vehicle, the monitoring device being designed to relay an image of the rear portion of the vehicle to the viewing device in the front portion of the vehicle.

1 Claim, 5 Drawing Sheets

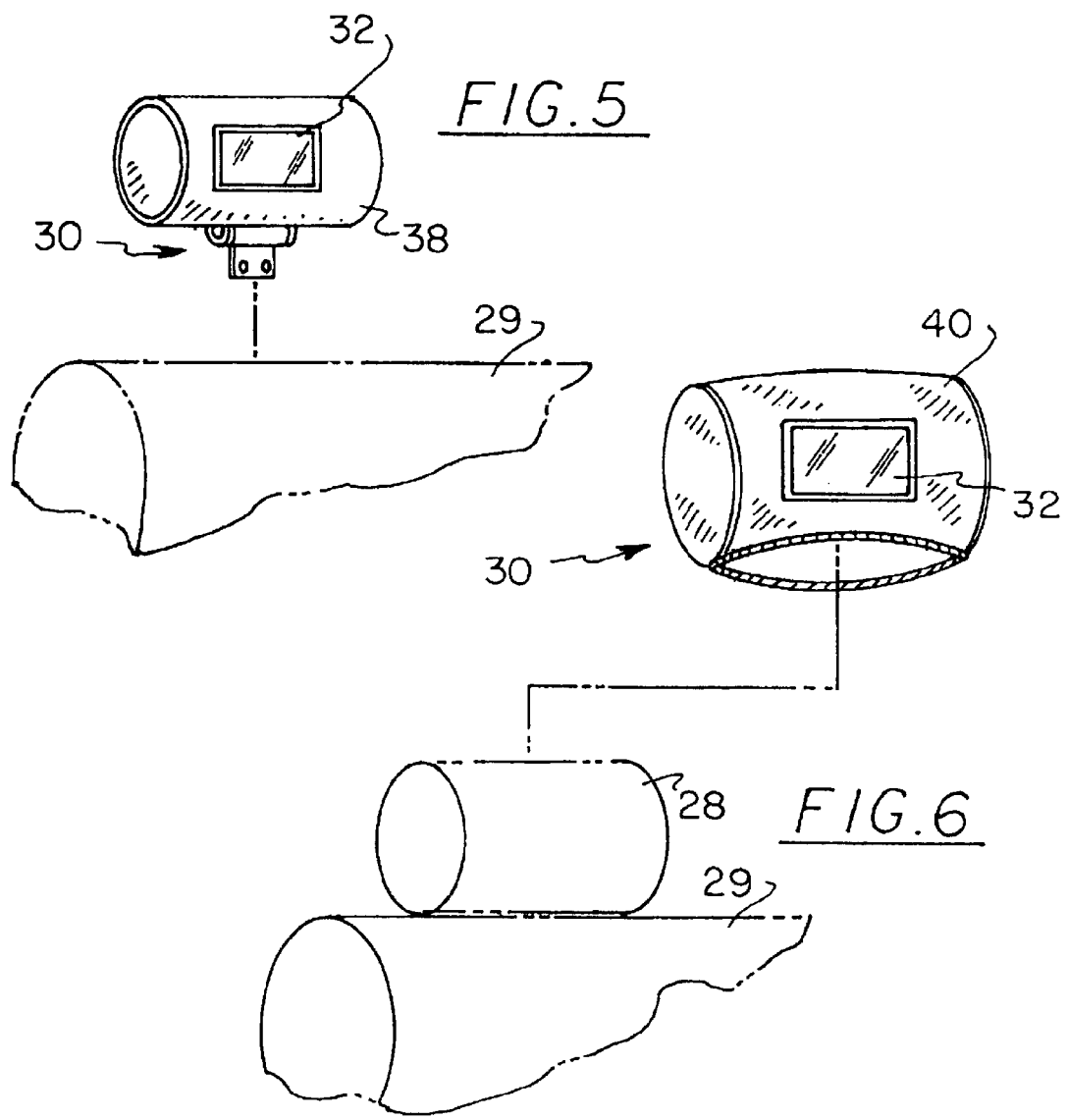

CHILD MONITORING SYSTEM

BACKGROUND OF THE INVENTION

1. Field of the Invention

The present invention relates to rear viewing systems and more particularly pertains to a new child monitoring system for monitoring children seated in a rear of the interior of a vehicle.

2. Description of the Prior Art

The use of rear viewing systems is known in the prior art. More specifically, rear viewing systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,687,305; U.S. Pat. No. 4,733,956; U.S. Pat. No. 5,576,898; U.S. Pat. No. 5,453,882; U.S. Pat. No. 1,986,033; and U.S. Patent No. Des. 332,076.

While these devices fulfill their respective, particular objectives and requirements, the aforementioned patents do not disclose a new child monitoring system. The inventive device includes a vehicle with an interior compartment, a housing coupled to an interior surface of a front portion of the interior compartment of the vehicle, a viewing device contained within the housing, a monitoring device coupled to an interior surface of a rear portion of the interior compartment of the vehicle, the monitoring device being designed to relay an image of the rear portion of the vehicle to the viewing device in the front portion of the vehicle.

In these respects, the child monitoring system according to the present invention substantially departs from the conventional concepts and designs of the prior art, and in so doing provides an apparatus primarily developed for the purpose of monitoring children seated in a rear of the interior of a vehicle.

SUMMARY OF THE INVENTION

In view of the foregoing disadvantages inherent in the known types of rear viewing systems now present in the prior art, the present invention provides a new child monitoring system construction wherein the same can be utilized for monitoring children seated in a rear of the interior of a vehicle.

The general purpose of the present invention, which will be described subsequently in greater detail, is to provide a new child monitoring system apparatus and method which has many of the advantages of the rear viewing systems mentioned heretofore and many novel features that result in a new child monitoring system which is not anticipated, rendered obvious, suggested, or even implied by any of the prior art rear viewing systems, either alone or in any combination thereof.

To attain this, the present invention generally comprises a vehicle with an interior compartment, a housing coupled to an interior surface of a front portion of the interior compartment of the vehicle, a viewing device contained within the housing, a monitoring device coupled to an interior surface of a rear portion of the interior compartment of the vehicle, the monitoring device being designed to relay an image of the rear portion of the vehicle to the viewing device in the front portion of the vehicle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new child monitoring system apparatus and method which has many of the advantages of the rear viewing systems mentioned heretofore and many novel features that result in a new child monitoring system which is not anticipated, rendered obvious, suggested, or even implied by any of the prior art rear viewing systems, either alone or in any combination thereof.

It is another object of the present invention to provide a new child monitoring system, which may be easily and efficiently manufactured and marketed.

It is a further object of the present invention to provide a new child monitoring system, which is of a durable and reliable construction.

An even further object of the present invention is to provide a new child monitoring system which is susceptible of a low cost of manufacture with regard to both materials and labor, and which accordingly is then susceptible of low prices of sale to the consuming public, thereby making such child monitoring system economically available to the buying public.

Still yet another object of the present invention is to provide a new child monitoring system which provides in the apparatuses and methods of the prior art some of the advantages thereof, while simultaneously overcoming some of the disadvantages normally associated therewith.

Still another object of the present invention is to provide a new child monitoring system for monitoring children seated in a rear of the interior of a vehicle.

Yet another object of the present invention is to provide a new child monitoring system which includes a vehicle with an interior compartment, a housing coupled to an interior surface of a front portion of the interior compartment of the vehicle, a viewing device contained within the housing, a monitoring device coupled to an interior surface of a rear portion of the interior compartment of the vehicle, the monitoring device being designed to relay an image of the rear portion of the vehicle to the viewing device in the front portion of the vehicle.

Still yet another object of the present invention is to provide a new child monitoring system that enhances the safety of children passengers and drivers of vehicles by allowing the drivers to monitor the children passengers without turning around or releasing the steering wheel.

Even still another object of the present invention is to provide a new child monitoring system that is adaptable and retrofitable into any vehicle with an interior compartment.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a schematic perspective view of an embodiment of the monitoring device of the present invention.

FIG. 6 is a schematic perspective view of an embodiment of the present invention.

DESCRIPTION OF THE PREFERRED EMBODIMENT

Figure 2:
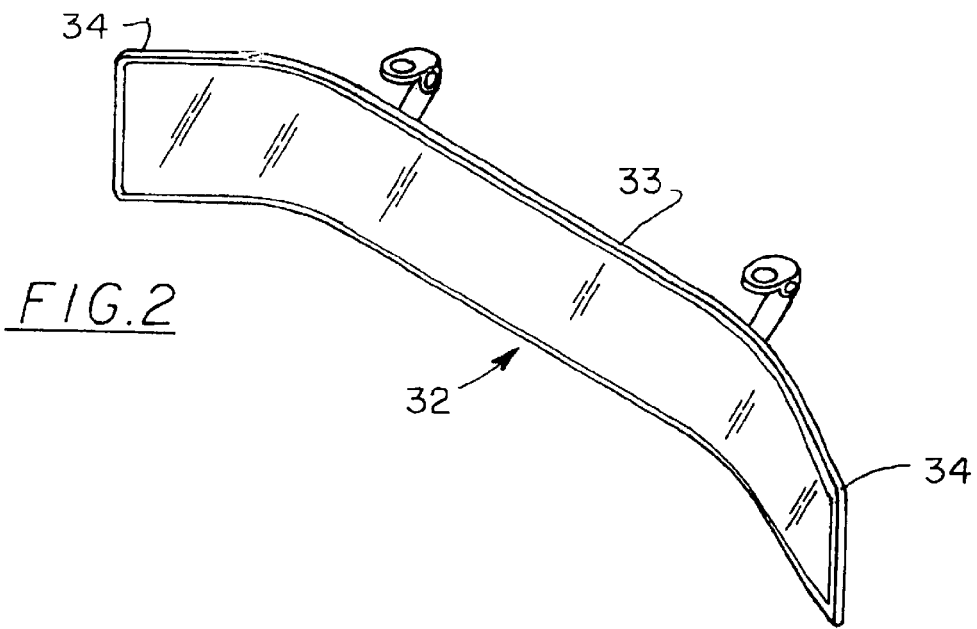
FIG. 2 is a schematic perspective view of one embodiment of the monitoring device of the present invention.
Figure 1:
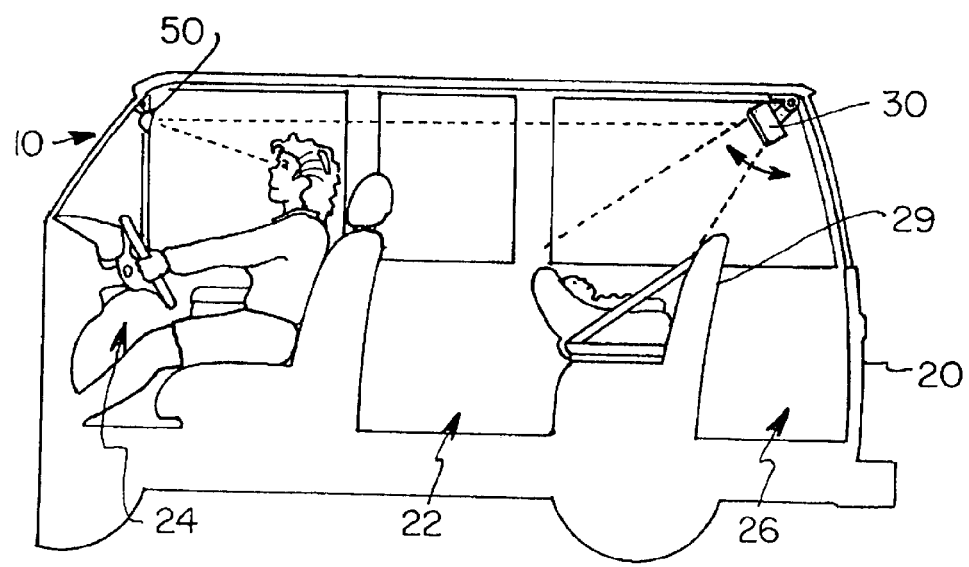
FIG. 1 is a schematic side view of a new child monitoring system according to the present invention.
Figure 3:
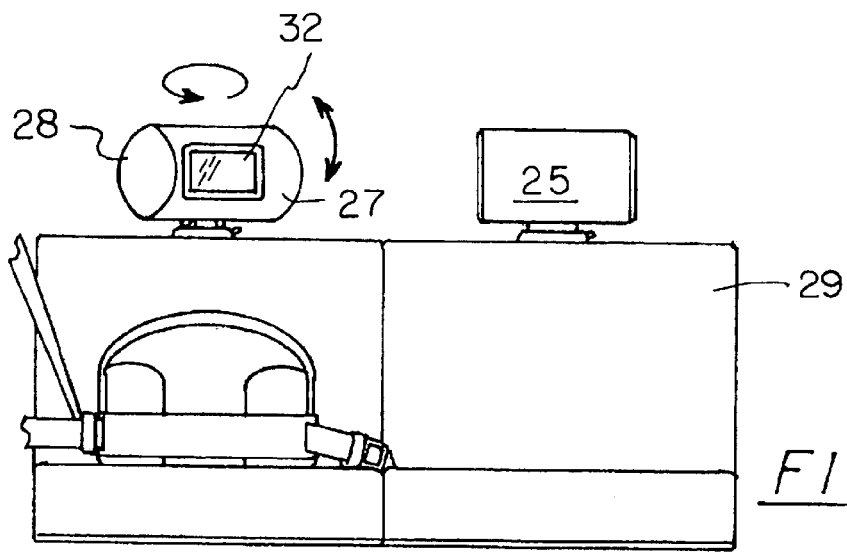
FIG. 3 is a schematic front view of an embodiment of the present invention.
Figure 4:
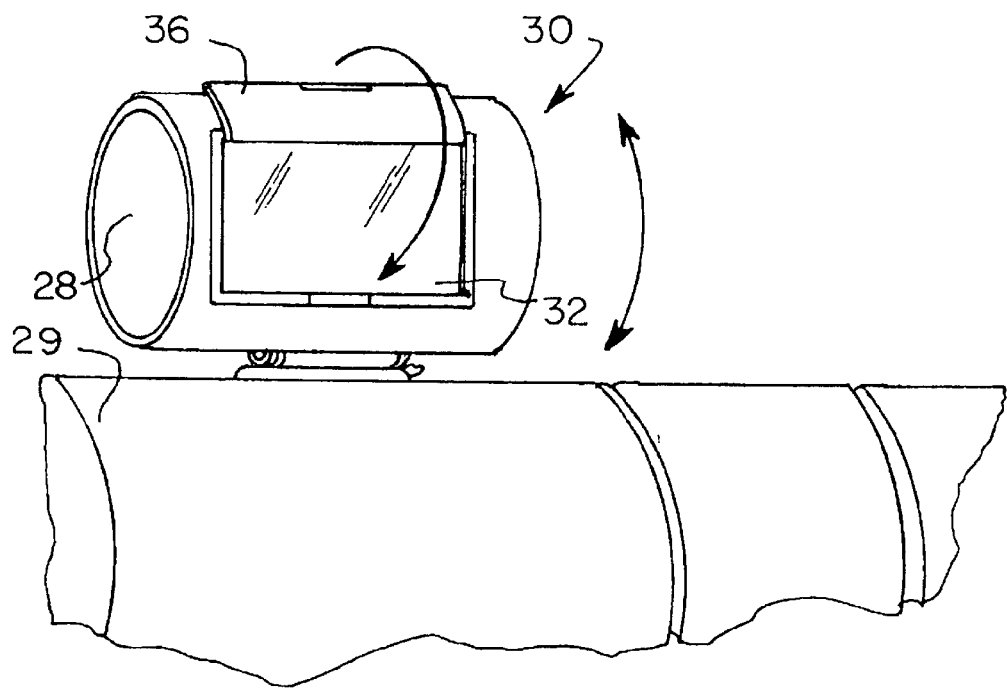
FIG. 4 is a schematic front view of an embodiment of the present invention.
Figure 7:
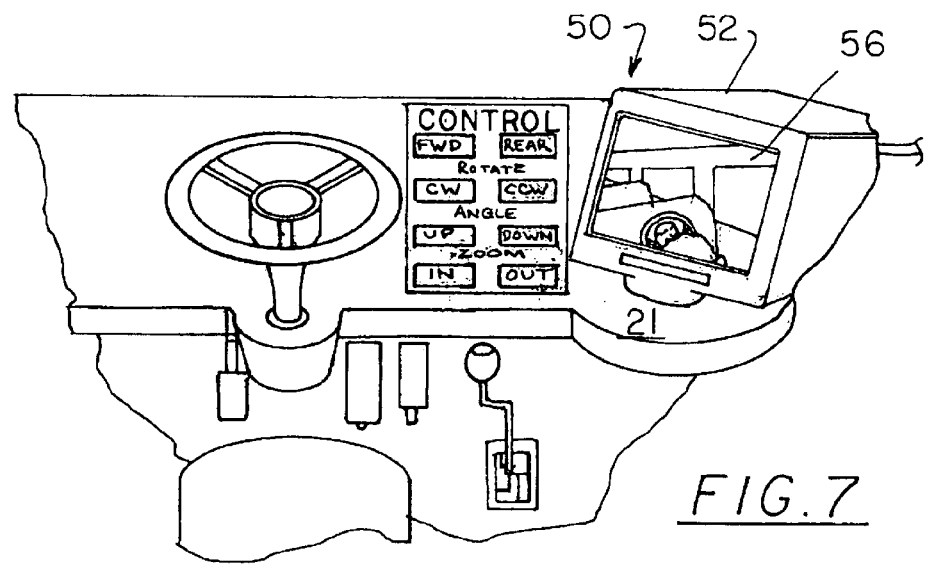
FIG. 7 is a schematic perspective view of an embodiment of the viewing device of the present invention.
Figure 8:
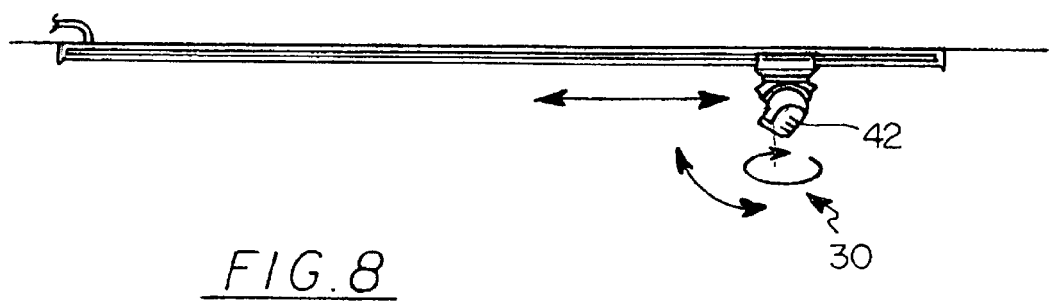
FIG. 8 is a schematic side view of an embodiment of the monitoring device of the present invention.
Figure 9:
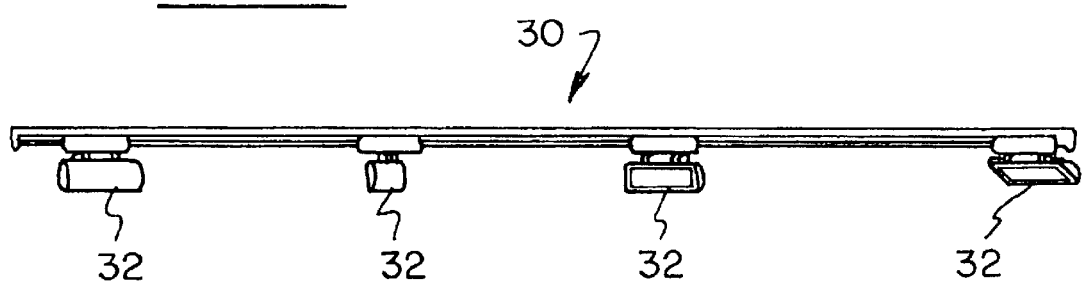
FIG. 9 is a schematic side view of an embodiment of the monitoring device of the present invention.
Figure 10:
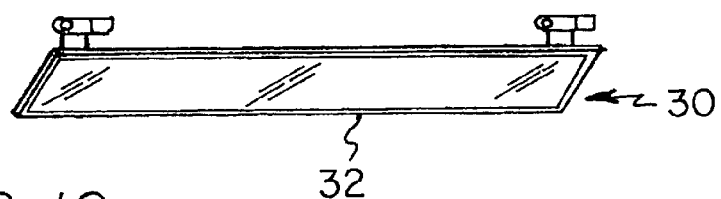
FIG. 10 is a perspective front view of an embodiment of the monitoring device of the present invention.

With reference now to the drawings, and in particular to FIGS. 1 through 10 thereof, a new child monitoring system embodying the principles and concepts of the present invention and generally designated by the reference numeral 10 will be described.

As best illustrated in FIGS. 1 through 10, the child monitoring system 10 generally comprises a vehicle 20, a monitoring device 30, and a viewing device 50.

The vehicle 20 includes an interior compartment 22. The interior compartment 22 includes a front portion 24 and a rear portion 26.

A housing 52 is coupled to an interior surface of the front portion 24 of the vehicle 20. The housing 52 envelops the viewing device 50.

The monitoring device 30 is coupled to an interior surface of the rear portion 26 of the vehicle 20.

The viewing device 50 is a rear-view mirror 54. The rear-view mirror 54 is positioned such that a driver of the vehicle 20 is able to view an area relatively behind the driver of the vehicle 20 by looking at the reflective surface of the rear-view mirror 54.

The monitoring device 30 is a monitoring mirror 32. The monitoring mirror 32 is couplable to an interior surface of the rear portion 26 of the vehicle 20. The monitoring mirror 32 is positionable such that a front surface of the mirror 32 is able to reflect an image of selectable areas of the rear portion 26 of the vehicle 20 for viewing by the driver when the driver observes the rear-view mirror 54.

In an embodiment the monitoring mirror 32 is elongate. The mirror 32 includes a medial portion 33 and two end portions 34. The end portions 34 are positioned relative to the medial portion 33 such that a plane formed by a front surface of the end portion 34 forms an oblique angle with a plane formed by a front surface of the medial portion 33, such that a broad field of view is reflected from the monitoring mirror 32 to the rear-view mirror 54.

In an embodiment of the invention, the monitoring device 30 is a monitoring mirror 32. The monitoring mirror 32 is coupled to a front surface 25 of a headrest 28, which is pivotally coupled to a rear seat 29 in the vehicle 2.0. The headrest 28 is pivotable such that the mirror 32 is able to capture a reflection of a selectable area of the rear portion 26 of the vehicle 20.

In one embodiment the headrest 28 of the vehicle 20 includes a front surface 25 and a rear surface 27. The headrest 28 is rotatable with respect to the rear seat 29 such that the front surface 25 and the rear surface 27 of the headrest 28 are selectably positioned to face a front of the vehicle 20. The mirror 32 is coupled to the rear surface 27 of the headrest 28 such that the headrest 28 includes a monitoring position and a normal position. The monitoring positioned is defined as the rear surface 27 of the headrest 28 facing the front of the vehicle 20 such that an image reflected by the monitoring mirror 32 is transferable to the rear-view mirror 54 for observation by the driver. The normal position is defined as the front surface 25 of the headrest 28 facing the front of the vehicle 20.

In a further embodiment the monitoring mirror 32 includes a cover member 36. The cover member 36 is includes a normal position and a monitoring position. The normal position is defined as the cover member 36 obscuring the surface of the mirror 32. The monitoring position is defined such that the cover member 36 does not obscure the surface of the mirror 32 such that an image of a selectable area of the rear portion 26 reflected by the monitoring mirror 32 is transferable to the rear-view mirror 54.

In an embodiment of the invention, the monitoring device 30 is a monitoring mirror 32. The monitoring mirror 32 is coupled to a headrest member 38. The headrest member 38 is couplable to a rear seat 29 of the vehicle 20. The headrest 38 is pivotable such that the monitoring mirror 32 is able to reflect an image of a selectable area of the rear portion 26 of the vehicle 20.

In another embodiment the monitoring device 30 is a monitoring mirror 32. The monitoring mirror 32 is coupled to a cover member 40. The cover member 40 conforms to an outer surface of a headrest 28 coupled to a rear seat 29 of the vehicle 20. The headrest 28 is pivotally adjustable such that the mirror 32 is able to reflect an image of a selectable area of the rear portion 26 of the vehicle 20.

In yet a further embodiment the monitoring device 30 is a plurality of monitoring mirrors 32. Each one of the plurality of monitoring mirrors 32 is positionable such that an image reflected by each one of the plurality of monitoring mirrors 32 is transferable to the rear-view mirror 54 such that multiple selectable areas of the rear portion 26 of the vehicle 20 are observable.

In an embodiment of the invention the viewing device 50 is a video monitor 56. The video monitor 56 is coupled to a dash 21 of the vehicle 20. The monitoring device 30 is a video camera 42. The video camera 42 is operationally coupled to the video monitor 56 such that an image captured by the video camera 42 is displayed on the video monitor 56. The video camera 42 is positionable such that an image of a selectable area of the rear portion 26 is capturable by the video camera 42. In a further embodiment the monitoring device 30 is a plurality of video cameras 42. The plurality of video cameras 42 is operationally coupled to the video monitor 56 such that a captured image from each one of the plurality of video cameras 42 is displayable on the video monitor 56 such that multiple selectable areas of the rear portion 26 of the vehicle 20 are observable.

In use the driver of the vehicle places the child to be observed in a rear seat of the vehicle. The driver adjusts the position of the monitoring device to observe the area of the rear portion of the vehicle inhabited by the child. The position of the viewing device is adjusted if necessary to align the viewing device with the monitoring device. The driver may then operate the vehicle in the conventional manner.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A child monitoring system comprising:
    a vehicle having an interior compartment, said interior compartment having a front portion and a rear portion;
    a housing coupled to an interior surface of said front portion of said vehicle, said housing having a viewing device;
    a monitoring device coupled to an interior surface of said rear portion of said vehicle;
    said viewing device being a rear-view mirror, said rear-view mirror being positioned such that a driver of said vehicle being able to view an area relatively behind the driver of said vehicle by looking at said reflective surface;
    said monitoring device being a monitoring mirror, said monitoring mirror being couplable to an interior surface of the rear portion of the vehicle, said monitoring mirror being positionable such that a front surface of said mirror being able to reflect an image of selectable areas of the rear portion of said vehicle for viewing by the driver when the driver observes said rear-view mirror;
    wherein said monitoring mirror being elongate, said mirror having a medial portion and two end portions, said end portions being positioned relative to said medial portion such that a plane formed by a front surface of said end portion forms an oblique angle with a plane formed by a front surface of said medial portion, such that a broad field of view being reflected from said monitoring mirror to said rear-view mirror;
    wherein said monitoring device being a monitoring mirror, said monitoring mirror being coupled to a front surface of a headrest pivotally coupled to a rear seat in said vehicle, said headrest being pivotable such that said mirror being able to capture a reflection of a selectable area of said rear portion of said vehicle;
    wherein said headrest of said vehicle having a front surface and a rear surface, said headrest being rotatable with respect to said rear seat such that said front surface and said rear surface of said headrest being selectably positioned to face a front of said vehicle, said mirror being coupled to said rear surface of said headrest such that said headrest having a monitoring position and a normal position, said monitoring position being defined as said rear surface of said headrest facing said front of said vehicle such that an image reflected by said monitoring mirror being transferable to said rear-view mirror for observation by the driver, said normal position being defined as said front surface of said headrest facing said front of said vehicle;
    wherein said monitoring mirror having a cover member, said cover member being having a normal position and a monitoring position, said normal position being defined as said cover member obscuring said surface of said mirror, said monitoring position being defined such that said cover member does not obscure said surface of said mirror such that an image of a selectable area of said rear portion reflected by said monitoring mirror being transferable to said rear-view mirror;
    wherein said monitoring device being a monitoring mirror, said monitoring mirror being coupled to a headrest member, said headrest member being couplable to a rear seat of said vehicle, said headrest being pivotable such that said monitoring mirror being able to reflect an image of a selectable area of the rear portion of the vehicle;
    wherein said monitoring device being a monitoring mirror, said monitoring mirror being coupled to a cover member, said cover member conforming to an outer surface of a headrest coupled to a rear seat of said vehicle, said headrest being pivotally adjustable such that said mirror being able to reflect an image of a selectable area of said rear portion of said vehicle;
    wherein said monitoring device being a plurality of monitoring mirrors, each one of said plurality being positionable such that an image reflected by each one of said plurality being transferable to said rear-view mirror such that multiple selectable areas of the rear portion of the vehicle are observable;

wherein said viewing device is a video monitor, said video monitor being coupled to a dash of said vehicle, said monitoring device being a video camera, said video camera being operationally coupled to said video monitor such that an image captured by said video camera being displayed on said video monitor, said video camera being positionable such that an image of a selectable area of said rear portion is capturable by said video camera, wherein said monitoring device being a plurality of video cameras, said plurality of video cameras being operationally coupled to said video monitor such that a captured image from each one of said plurality being displayable on said video monitor such that multiple selectable areas of the rear portion of the vehicle are observable.

* * * * *